June 15, 1943.          G. K. NEWELL          2,322,049
BRAKE MECHANISM
Filed July 31, 1940          4 Sheets-Sheet 1
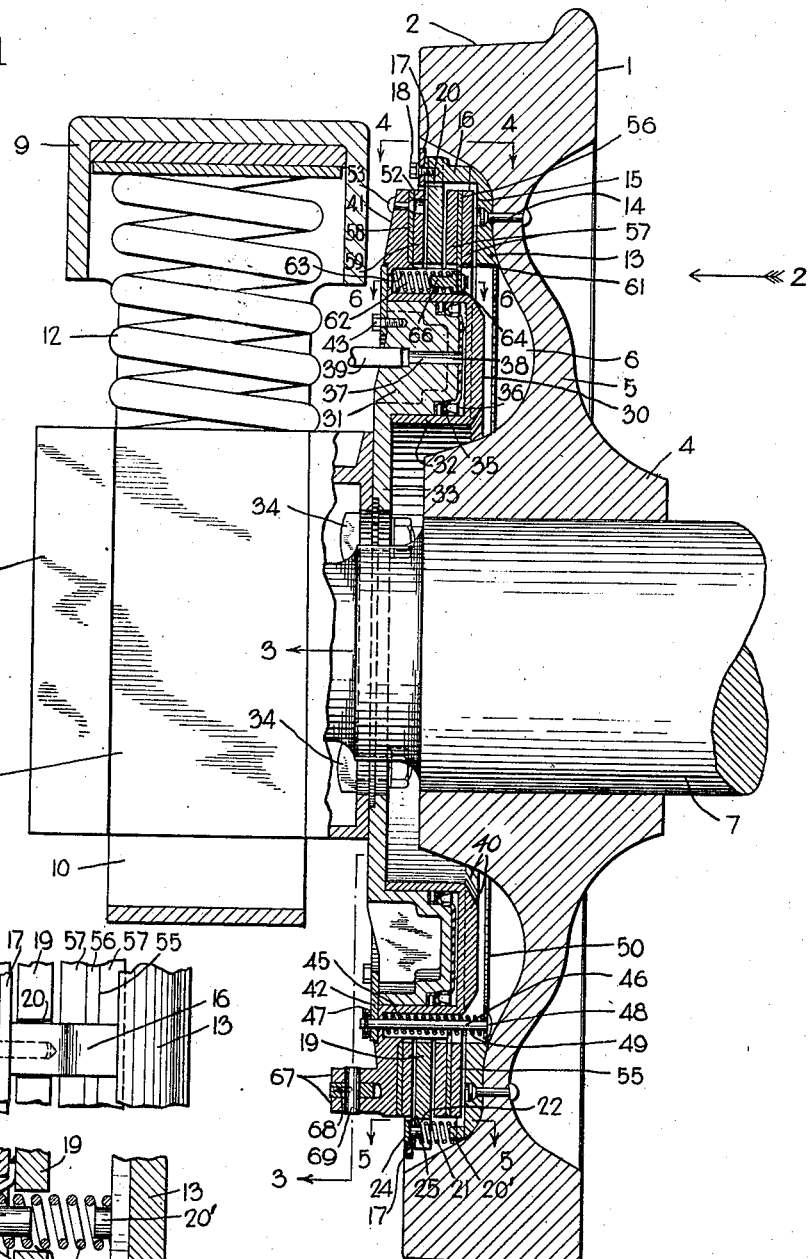
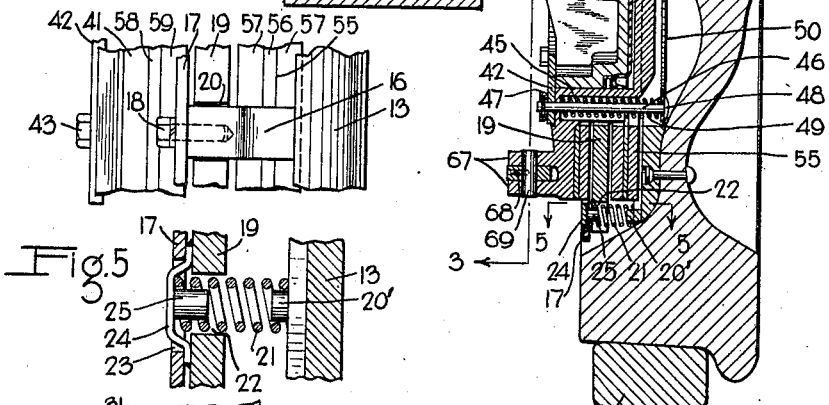
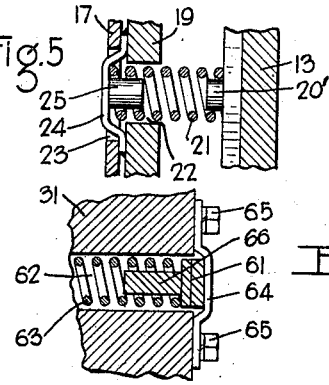
INVENTOR
GEORGE K. NEWELL
BY *A. M. Higgins*
ATTORNEY

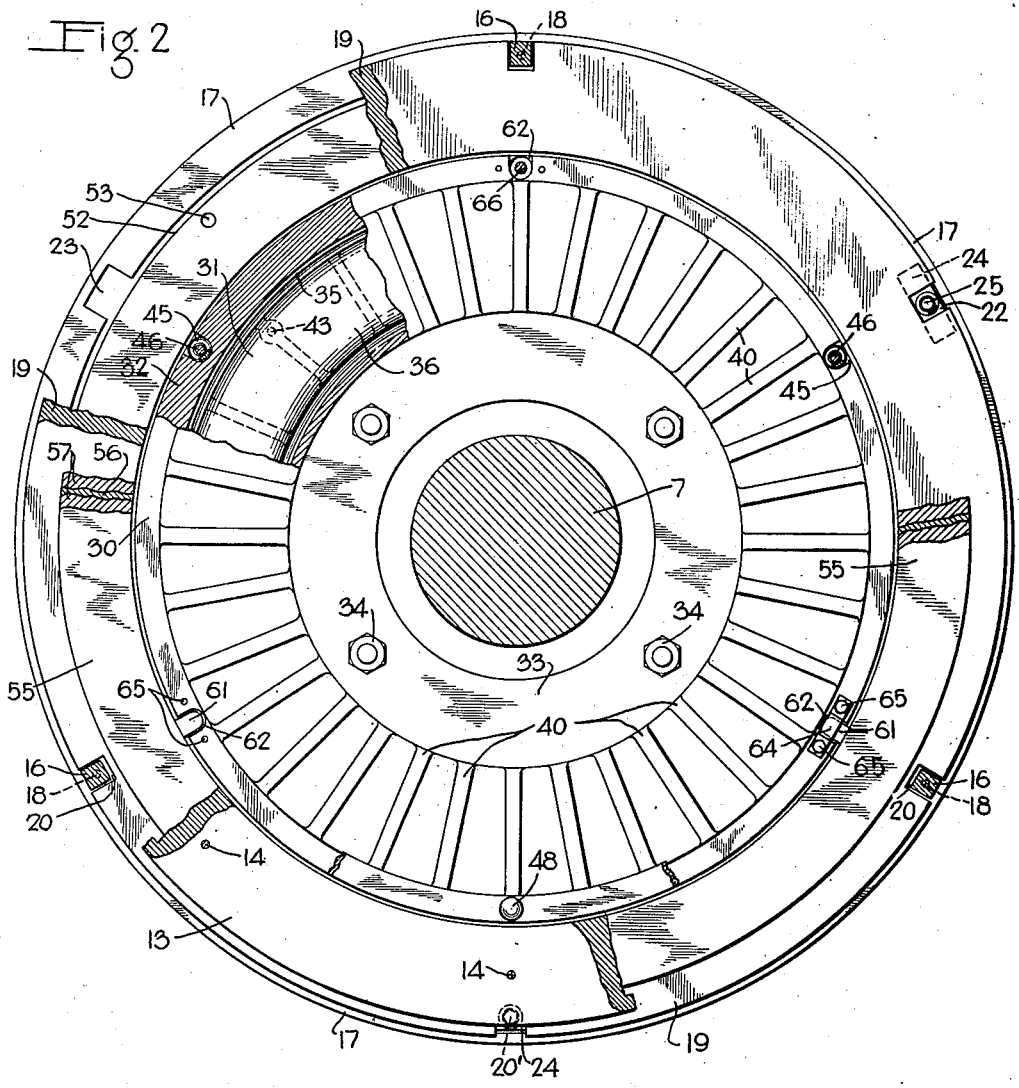
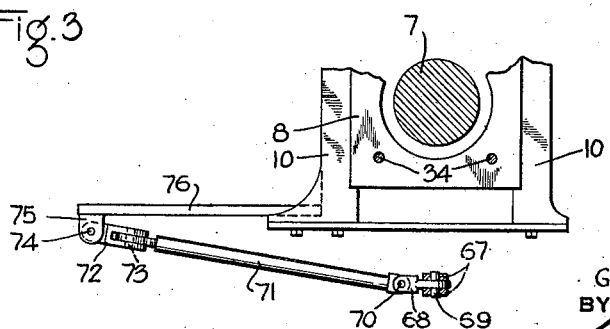

June 15, 1943.   G. K. NEWELL   2,322,049
BRAKE MECHANISM
Filed July 31, 1940   4 Sheets-Sheet 3
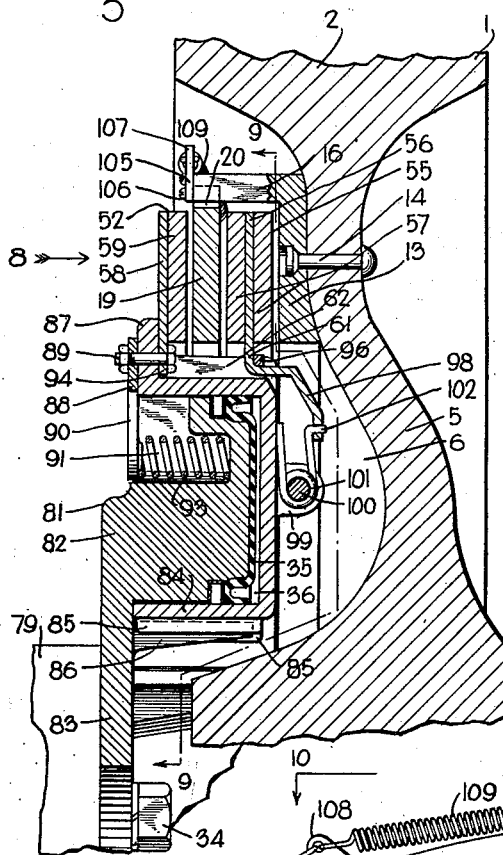
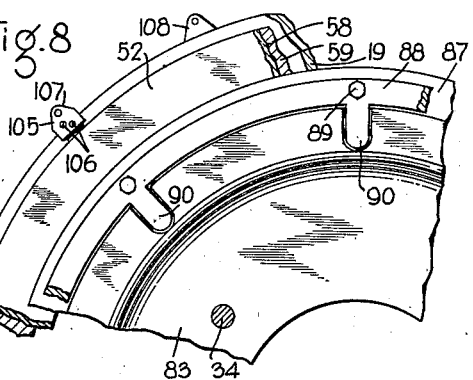
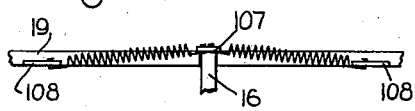
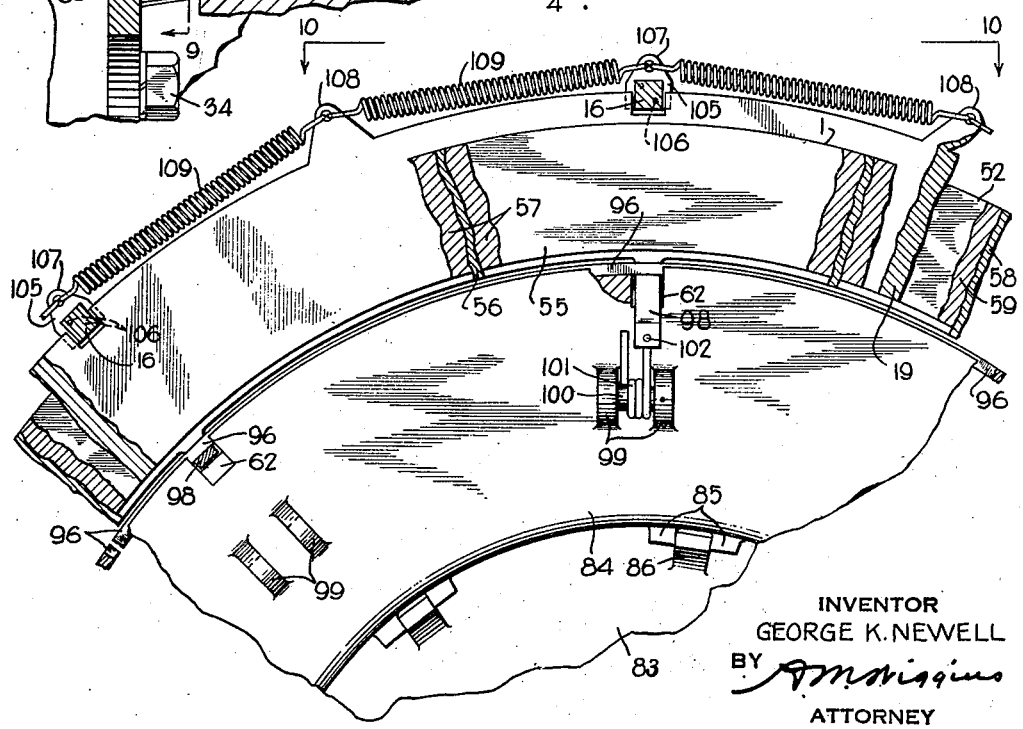
INVENTOR
GEORGE K. NEWELL
BY
ATTORNEY June 15, 1943.　　　G. K. NEWELL　　　2,322,049
BRAKE MECHANISM
Filed July 31, 1940　　　4 Sheets-Sheet 4
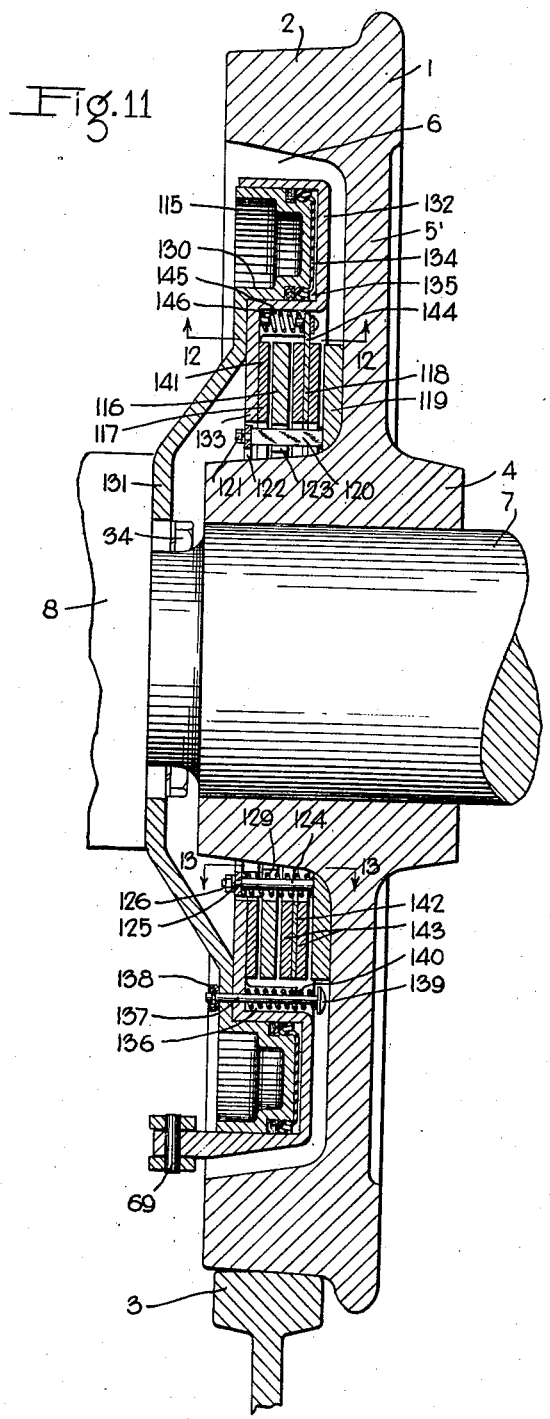

Patented June 15, 1943

2,322,049

UNITED STATES PATENT OFFICE 2,322,049

BRAKE MECHANISM

George K. Newell, near Pitcairn, Pa., assignor to The Westinghouse Air Brake Company, Wilmerding, Pa., a corporation of Pennsylvania Application July 31, 1940, Serial No. 348,631

21 Claims. (Cl. 188—153)

This invention relates to brake mechanism and more particularly to the disk type of brake mechanism for braking a rotatable element such for instance as the wheel or wheels of railway vehicles.

In certain trucks for railway vehicles there is little space available for the installation of brake mechanisms of the above type and one object of the invention is the provision of an improved, compact, disk brake mechanism which is particularly adapted for, though not limited to, installation in such limited spaces.

Another object of the invention is the provision of an improved disk brake mechanism adapted to be substantially contained in the space between the tread and hub of a railway vehicle wheel at one side of the web connecting said tread and hub.

Another object of the invention is the provision of an improved disk brake mechanism, including friction disks and a brake cylinder device, having an axial length substantially no greater than the distance across the brake elements measured parallel to their axes or substantially no greater than the length of the brake cylinder device.

Other objects and advantages will be apparent from the following more detailed description of the invention.

In the accompanying drawings; Fig. 1 is a vertical sectional view taken through a wheel and the side frame at one end of a railway vehicle truck and showing in vertical section the improved brake mechanism; Fig. 2 is an end view of the improved brake mechanism taken in the direction of the arrow 2 in Fig. 1, with the truck wheel removed, certain parts of the brake mechanism being broken away to show interior construction; Figs. 3 to 6 are sectional views taken on the lines 3—3, 4—4, 5—5 and 6—6, respectively, in Fig. 1; Fig. 7 is a vertical sectional view of a portion of another embodiment of the invention; Fig. 8 is an end view of a portion of the brake mechanism shown in Fig. 7 taken in the direction of the arrow 8 in Fig. 7; Fig. 9 is a sectional view taken on the line 9—9 in Fig. 7; Fig. 10 is a side view of a portion of the brake mechanism shown in Figs. 7 to 9 as viewed from the line 10—10 in Fig. 9; Fig. 11 is a vertical sectional view similar to Fig. 1 but showing still another embodiment of the invention; and Figs. 12 and 13 are sectional views taken on the lines 12—12 and 13—13, respectively, in Fig. 11.

General description

In the drawings the reference numeral 1 indicates a wheel of a railway vehicle truck, which wheel comprises the usual tread portion 2 for rolling on a track rail 3, a hub 4 and an annular web 5 connecting the tread 2 and hub 4 in Figs. 1 and 7, said tread and hub being connected by a web 5' in Fig. 11. An annular cavity 6 is provided in the outer face of the wheel 1 between the tread 2 and hub 4 at one side of the connecting web, and in said cavity the major portion of the improved disk brake mechanism is adapted to be mounted, as will be later described.

An axle 7 is mounted in the hub portion 4 of the wheel 1 and extends beyond the outer face thereof for carrying a journal box 8. A side frame member 9 is disposed above the journal box 8 and is provided with the usual depending pedestal legs 10 which are spaced apart and slidably mounted in slots 11 provided in the opposite sides of the journal box 8, and which prevents rotation of the journal box with the axle. A support spring 12 is interposed between the journal box 8 and side frame member 9 for resiliently supporting said member and providing for vertical movement thereof relative to the journal box.

Railway vehicle trucks of the type shown in the drawings and above described are so well known that a more detailed description thereof is not deemed essential to a clear understanding of the invention.

Description of brake mechanism shown in Figs. 1 to 6

The improved disk brake mechanism shown in Figs. 1 to 6 comprises an annular ring-like rotatable brake element 13 disposed in the cavity 6 in the outside face of the wheel 1 in concentric relation with the wheel. The end face of the brake element 13 adjacent the wheel web 5 is shaped to engage said web at least over two annular portions preferably arranged adjacent the inner and outer peripheral portions of said face. The brake element 13 is rigidly secured to the wheel web 5 by a plurality of rivets 14 which are equally spaced apart around the brake element. On the opposite end of the brake element 13 there is formed an annular braking face 15 which extends at right angles to the axis of the wheel 1.

Beyond the braking face 15 the brake element 13 is provided with a plurality of fingers 16 which are equally spaced apart around said element and which extend in the direction of the truck side frame 9 parallel to the axis of the element. A ring 17, mounted against the ends of the fingers 16, is rigidly secured thereto by cap screws 18. The fingers 16 extend through slots 20 provided in an annular ring-like rotatable brake element 19 adjacent its outer periphery, the opposite sides of the slots having sliding contact with the opposite sides of said fingers thus providing for axial movement of said brake element toward and away from the brake element 13. The fingers 16 support the rotatable brake element 19 in coaxial relation with the rotatable brake element 13 and are adapted to turn the rotatable brake element 19 with the rotatable brake element 13 and thereby with the wheel 1. For the purpose of simplicity only three fingers 16 are shown in the illustrative embodiment.

Between each pair of fingers 16 the brake element 13 is provided with a lug 20' supporting one end of a release spring 21 which extends in the direction of the ring 17 through suitably aligned apertures 22 and 23 in the brake element 19 and said ring, respectively. A spring seat 24 is mounted against the outer face of the brake element 19 over each of the apertures 22 and has its opposite ends secured, preferably by welding, to said element. The central portion of each spring seat 24 is adapted to extend through the aligned aperture 23 in the ring 17 and the ends of said seat are adapted to engage said ring at each side of aperture 23 for defining the release position of the brake element 19. Each spring seat 24 has a lug 25 which extends into the aperture 22 in the brake element 19, the adjacent end of the spring 21 fitting over said lug for supporting the spring in operative alignment with the lug 20' projecting from the brake element 13. The several release springs 21 are under compression and are provided for moving the rotatable brake element 19 in a direction away from the rotatable brake element 13, which is rigidly secured to the wheel 1, into engagement with the ring 17 which defines the brake release position of the brake element 19.

The fingers 16 and lugs 20' projecting from the brake element 13 are preferably formed separate from said brake element and are welded thereto in the positions shown.

The annular brake element 19 encircles a concentrically arranged annular brake cylinder device 30, the outside diameter of which is somewhat less than the inner diameter of said brake element.

The brake cylinder device 30 comprises an annular stationary part and an annular movable part carried by the stationary part, the stationary part in the present embodiment being an annular brake cylinder piston 31 while the movable part is a brake cylinder casing 32 which is carried by the piston 31 and mounted to slide thereon in the direction toward and away from the wheel 1.

The brake cylinder piston 31 is provided with an inwardly extending annular flange 33 which is rigidly secured against the inner end of the journal box 8 by bolts 34. The piston 31 extends into an annular bore provided in the casing 32 and is provided on its inner end with an annular packing cup 35 having sliding contact with the walls of the bore in the casing and cooperating with the closed end of the bore to provide a pressure chamber 36. The piston 31 has a passage 37 which registers at one end with an aperture 38 provided through the packing cup 35 to connect said passage to the pressure chamber 36. The other end of passage 37 is connected to a pipe 39 through which fluid under pressure is adapted to be supplied to and vented from the pressure chamber 36. A plurality of radially extending strengthening ribs 40 are provided on the end of the brake cylinder casing 32 adjacent the wheel web 5.

In Fig. 1 the brake cylinder casing 32 is shown in its release position with respect to the piston 31 and it will be noted that the pressure face of the packing cup 35 is spaced slightly from the casing so that communication between the aperture 38 and pressure chamber 36 will always be open.

At the end of the brake cylinder casing 32 adjacent the truck frame 9 said casing is provided around its outer periphery with an outwardly extending annular flange 41 the outside diameter of which is substantially equal to that of the braking face 15 on the brake element 13 and the like braking faces provided on the opposite faces of the rotatable brake element 19. A ring 42 is secured by cap screws 43 to the face of the brake cylinder piston 31 which is adjacent the journal box and overlaps the adjacent portion of the brake cylinder casing flange 41 for engagement thereby to limit movement of the brake cylinder casing in the direction away from the wheel 1 and to thereby define its brake release position. If desired, the inner portion of the brake cylinder casing 32 which is encircled by the piston 31 may be designed to engage the piston flange 33 at the same time as the ring 42 is engaged by flange 41 for aiding in defining the release position of the brake cylinder casing.

The brake cylinder casing 32 is provided in its outer periphery with a plurality of slots 45 which are open at the end adjacent the wheel and closed at the opposite end. These slots extend parallel to the axis of the brake cylinder device and a release bolt 46 in each extends through suitably aligned bores in the closed end of the slot and in the ring 42 beyond which there is secured to each of the bolts a member 47 for engaging the outer face of said ring. On the oppositie end of each bolt 46 is a head 48 which is disposed adjacent to but out of contact with the wheel web 5. A release spring 49 is carried by each of the bolts 46, one end of the spring engaging the closed end of the respective slot 45 while the opposite end acts against the head 48. The several release springs 49 are under compression and since one end of the bolts 46 is secured to the fixed ring 42 said springs act on the brake cylinder casing 32 for moving same to its release position in engagement with said ring and with the piston flange 33.

If desired, the ends of the several release bolts 46 adjacent the wheel may be connected by a ring 50 which encircles the wheel hub 4 within the cavity 6 and which is provided with suitable apertures through which the bolts 46 extend, the springs 49 acting against the ring urging same into contact with the bolt heads 48. This ring is adapted to support the ends of the release bolts 46 for maintaining them aligned with each other and with the bores through the closed ends of the slots 45, so that the brake cylinder casing 32 may freely move relative to said bolts.

The brake cylinder flange 41 is provided for carrying an annular ring-like non-rotatable brake element 52 which encircles the brake cylinder device and which is interposed between the flange 41 and the adjacent face of the rotatable brake element 19.

The non-rotatable brake element 52 comprises an annular backing plate 58 preferably made of material to resist cracking such as sheet steel and a brake shoe 59 secured to one face of said backing plate in any desired manner. The opposite face of the backing plate 58 engages the flange 41. Rivets 53 extending through the non-rotatable brake element 52 and flange 41 rigidly secure said brake element to said flange.

The brake shoe 59 is adapted to engage the adjacent face of the rotatable brake element 19 to effect braking of the wheel 1. The brake element 19 is preferably made of a material to resist abrasion by brake shoe 59 while said shoe is preferably made of material having desired frictional characteristics for cooperation with the rotatable brake element 19 to obtain desired braking action. By such a preferred arrangement, there will be substantially no wear of the rotatable brake element 19 in service and only the non-rotatable brake element will therefore require replacement.

An annular ring-like non-rotatable brake element 55 encircling the brake cylinder casing 32 is interposed between the two rotatable brake elements 13 and 19 and comprises a steel backing plate 56 and a brake shoe 57 secured to each of its opposite faces for frictional braking contact with the adjacent faces of the rotatable brake elements 13 and 19. The backing plate 56 is similar to that of the non-rotatable braking brake element 52 while the brake shoes 57 are preferably the same as brake shoe 59.

The inside and outside diameters of the backing plates and brake shoes of the two non-rotatable brake elements are substantially the same and in coaxially relation with the braking face 15 on the rotatable brake element 13 and the like oppositely arranged braking faces on the rotatable brake element 19.

Projecting from the inner edge of the backing plate 56 of the non-rotatable brake element 55 are a plurality of fingers 61 which are equally spaced from each other and which extend into slots 62 in the brake cylinder casing 32, the slots 62 being like the slots 45 and alternating therewith. In each slot 62 there is a release spring 63 one end of which bears against the closed end of the slot while the opposite end bears against the finger 61 in the slot, said spring being under compression and therefore operative on the finger 61 for urging the non-rotatable brake element 55 in the direction of wheel 1.

For limiting such movement of the non-rotatable brake element 55 and for thereby defining its brake release position a strap 64 is provided over the open end of each slot 62 for engagement by the finger 61 in said slot, said strap being secured to the brake cylinder casing by cap screws 65. A pin 66 secured to each finger 61 preferably by welding extends into the spring 63 in the respective slot 62 for maintaining said spring in operative alignment with the finger 61.

When the non-rotatable brake element 52 is in its release position effected by the operation of springs 49 and defined by engagement of the brake cylinder casing 32 with the ring 42 and piston flange 33, the straps 64 are adapted to position the non-rotatable brake element 55 substantially midway between the rotatable brake elements 13 and 19 when the rotatable brake element 19 is in its release position effected by operation of springs 21 and defined by engagement of the spring seat 24 with the ring 17. Under this condition the springs 63 acting on the fingers 61 projecting from the non-rotatable brake element 55 hold said element in contact with the straps 64. With all of the brake elements in their brake release positions just described they are adapted to be spaced from each other, as shown in the drawings.

From the above description it will be apparent that the fingers 16 are adapted to turn the rotatable brake element 19 with the rotatable brake element 13 and that both of said brake elements are adapted to rotate with the vehicle wheel 1. The non-rotatable brake element 52 being fixed to the brake cylinder casing 32 is secured against movement relative to said casing while the non-rotatable brake element 55 is fixed against turning relative to said casing by the fingers 61, said casing and brake elements being however capable of turning in unison relative to the brake cylinder piston 31 which supports same. For holding the brake cylinder casing 32 and the non-rotatable brake elements carried thereby against turning, the brake cylinder casing 32 is provided below the axle 7 with two outstanding, spaced lugs 67 between which there is disposed one end of a torque element 68, a vertical arranged pin 69 extending through said element and lug. The other end of the element 68 is connected by a horizontally extending pin 70 to one end of a torque rod 71 the other end of which is connected to a member 72 by a pin 73 having its axis arranged at right angles to that of the pin 70. The other end of the member 72 is connected by a horizontally extending pin 74 to a lug 75 depending from a bracket 76 which projects from and is rigidly secured to one of the pedestal legs 10 for movement with the truck frame member 9. The connection just described between the brake cylinder casing and truck frame provides for free movement of the brake cylinder casing axially of the brake cylinder piston and thus relative to the truck frame as well as vertical movement of said frame relative to the brake mechanism without interference with operation of the brake mechanism.

*Operation of embodiment shown in Figs. 1 to 6*

Let it be assumed that the parts of the brake mechanism are in their release positions above described so that the annular rotatable and non-rotatable brake elements are out of contact with each other. The rotatable brake elements 13 and 19 are thus free to turn with the wheel 1, while the non-rotatable brake elements 52 and 55 and the brake cylinder casing 32 carrying said non-rotatable brake elements are held against rotation by the connection with the truck frame through the torque rod 71.

If it is now desired to brake the wheel 1, fluid under pressure is supplied by any suitable means to pipe 39 through which it flows to pressure chamber 36 in the brake cylinder device 30. The pressure of fluid thus obtained in the chamber 36 acts on the brake cylinder casing 32 to move same relative to the brake cylinder piston 31 in the direction of the wheel 1, this movement being against the opposing pressure of the brake cylinder casing release springs 49.

As the brake cylinder casing 32 is thus operated the non-rotatable brake element 52 is moved in the direction of and into contact with the rotatable brake element 19 while the non-rotatable brake element 55 is at the same time moved by springs 63 in the direction of the rotatable brake element 13. At substantially the time the non-rotatable brake element 52 contacts the adjacent face of the rotatable brake element 19 the non-rotatable brake element 55 also contacts the adjacent face of the rotatable brake element 13. After this occurs the further movement of the brake cylinder casing 32 in the direction of the wheel is relative to the non-rotatable brake element 55 and opposed by the release springs 63 for said element, while movement of the non-rotatable brake element 52 with said casing shifts the rotatable brake element 19 along the fingers 16 in the direction of and finally into contact with the non-rotatable brake element 55. When the rotatable brake element 19 is thus moved into contact with the rotatable brake element 55 it will be apparent that all of the annular brake elements are in engagement following which the pressure of fluid acting in the pressure chamber 36 squeezes said elements together with a force depending upon the pressure of fluid supplied to said chamber. As a result, the non-rotatable brake elements 52 and 55, which are held against turning by the torque rod 71, create a drag on the rotatable brake elements 13 and 19 which acts to retard rotation of the wheel 1 or to brake same. The degree of braking thus obtained on wheel 1 may be varied in the usual manner according to the pressure of fluid supplied through the pipe 39 to chamber 36 for urging the brake cylinder casing 32 in the direction of said wheel, so that any desired degree of braking of said wheel may be obtained.

In order to release the brakes on wheel 1 the fluid under pressure is vented from the pressure chamber 36 through the pipe 39 and when sufficiently reduced the release springs 49 acting on the brake cylinder casing 32 move said casing back to its release position shown and defined by engagement with the ring 42 secured to the brake cylinder piston. As the brake cylinder casing is thus returned to its release position, the springs 21 act to move the rotatable brake element 19 away from the wheel 1 to its release position defined by contact with the ring 17, while the non-rotatable brake element 55 is pulled to its release position by the straps 64 engaging the fingers 61 projecting therefrom. The springs 63 acting on fingers 61 maintain same in contact with the straps 64 so that with the brake cylinder casing 32 in its release position the non-rotatable brake element 55 will be held out of contact with the two rotatable brake elements. With the parts returned to their release positions, the rotatable brake elements 13 and 19 are again free to rotate with the wheel 1, or in other words, the brakes on the wheel are released.

When the brakes on the wheel 1 are applied, it will be noted that the non-rotatable brake elements 52 and 55 are held against rotation by the connection with the truck frame side member 9 through the torque rod 71. The journal box 8 is thus free of forces during braking which would tend to turn same between the pedestal legs 10 and cause binding thereof or undue wear of said legs and journal box, it being noted however that said journal box supports the brake cylinder device and non-rotatable brake elements. It will further be noted that the brake cylinder casing 32 is in effect journaled on the brake cylinder piston 31 and thus free to turn relative to the brake cylinder piston to compensate for different vertical positions which the side frame member 9 may assume with respect to the journal box due to vibration or various degrees of load carried by the vehicle supported on said frame.

*Description of brake mechanism shown in Figs. 7 to 10*

The embodiment of the invention shown in Figs. 7 to 10 is very similar to that above described in that it comprises annular rotatable brake elements 13 and 19 interleaved with annular non-rotatable brake elements 55 and 52, said brake elements encircling in concentric relation an annular brake cylinder device 81.

The brake cylinder device 81 comprises an annular brake cylinder piston 82 which encircles the axle 7 and which is provided with an annular inwardly extending flange 83 rigidly secured to the inner end face of a journal box 79 by bolts 34. Slidably mounted on the brake cylinder piston 82 is a brake cylinder casing 84. The brake cylinder piston 82 has on its inner end a packing cup 35 and between said cup and the casing 82 there is provided a pressure chamber 36 to which fluid under pressure is adapted to be supplied for moving the casing in the direction of the wheel 1 for applying the brakes, the same as in the embodiment above described.

The brake cylinder casing 84 is provided around its inner peripherial surface with a plurality of pairs of spaced lugs 85 between each pair of which there is disposed a tongue 86 which projects from the piston flange 83. Interengagement between the lugs 85 and tongues 86 is adapted to hold the brake cylinder casing 84 against turning relative to the piston 82 but provides for axial movement of said casing relative to said piston. This construction provides for the brake cylinder casing and the non-rotatable brake elements being held against rotation during braking directly from the journal box 79 as is permissible in certain truck designs where relatively large area bearing surfaces are provided on the interengaging parts of the journal box and pedestal legs.

An annular flange 87 is provided around the outer periphery of the brake cylinder casing 84 at its end most remote from the wheel 1. A release ring 88 is mounted against the outer face of flange 87 and rigidly secured thereto by bolts 89. Projecting from the inner edge of ring 88 are a plurality of spaced fingers 90 which are aligned with slots 91 in the brake cylinder piston 82 into which said fingers are adapted to move. A release spring 93 is disposed in each of the slots 91 and bears at one end against the piston 82 and at its opposite end against the aligned finger 90. These springs are under compression and act to move the brake cylinder casing 84 relative to the brake cylinder piston 82 to its release position in which it is shown and which is defined by engagement between the casing and the piston flange 83.

The flange 87 projecting from the brake cylinder casing overlaps the backing plate 58 of the non-rotatable brake element 52 which differs from the corresponding element shown in Fig. 1 in that said backing plate is provided around its inner periphery with a plurality of inwardly extending fingers 94 which are spaced to fit in the slots 62 in the brake cylinder casing and through which bolts 89 extend for rigidly securing said brake element to the flange 87.

The brake cylinder casing is provided around its outer periphery at the end adjacent the wheel 1 with an annular groove in which is contracted a snap ring 96 for engagement by the fingers 61 projecting from the non-rotatable brake element 55 into the slots 62 to define the release position of said brake element. Each of the fingers 61 is provided with an extension 98 projecting through the space between the snap ring 96 and the bottom of the respective slot 62 in the direction of the wheel web 5 and which, beyond the brake cylinder casing, is bent inwardly over the end of said casing.

The brake cylinder casing 84 is provided on the end face adjacent the wheel 1 with a pair of outstanding lugs 99 which are spaced inwardly from the end of each finger extension 98. Each pair of lugs 89 carries a pin 100 around which is coiled a torsion spring 101, one end of which bears against the brake cylinder casing while the other end is provided with a hook 102 which fits into an aperture provided in the end of the aligned finger extension 98. The several springs 101 are under tension and therefore operative through the medium of the finger extensions 98 to move the non-rotatable brake element 55 in the direction of wheel 1 and into engagement with the snap ring 96 when the brakes are released the springs 101 also provide for movement of the brake cylinder casing 84 relative to the brake element 55 in the direction of the wheel in effecting an application of the brakes, these springs therefore acting in the same capacity as the springs 63 in the embodiment of the invention shown in Fig. 1, while the snap ring 96 acts in the same manner as the straps 64 employed in said embodiment.

A stop 105 is secured by screws 106 to the end of each of the fingers 16 projecting from the rotatable brake element 13 for engagement by the rotatable brake element 19 to define its release position. Each stop 105 is provided with an outwardly extending finger 107. Midway between each pair of fingers 107 the rotatable brake element 19 is provided with a finger 108 projecting from its outer peripherial surface. Two oppositely extending tension springs 109 have one end connected to each of the fingers 108, the opposite ends of these springs being connected to the fingers 107 on the stops 105 at each side of the lugs 108. The several springs 109 are under tension and their lines of action are at an angle to the braking surfaces on the non-rotatable brake element 19 so as to urge said element in the direction of the release stops 105. The springs 109 constitute the release springs for the brake element 19 like the springs 21 shown in the embodiment above described and act in a like manner during operation of the brake mechanism.

*Operation of brake mechanism shown in Figs. 7 to 10*

The operation of this embodiment of the invention will be readily apparent from the description of parts and the description of the operation of the embodiment shown in Figs. 1 to 6. It is however desired to point out that in this embodiment the brake cylinder casing and non-rotatable brake elements are held against rotation by the journal box 79 in contrast to the truck frame side member 9 which performs this function in the embodiment shown in Figs. 1 to 6.

*Description of brake mechanism shown in Figs. 11 to 13*

This embodiment of the invention differs mainly from the embodiments above described in that the brake cylinder device, indicated by the reference numeral 115, is arranged around or encircles the outer peripheries of an annular rotatable brake element 116 and annular non-rotatable brake elements 117 and 118 which are axially movable, and an annular rotatable brake element 119 which is fixed to the web 5' of wheel 1 against axial movement, said brake cylinder device being arranged in coaxial and concentric relation with said brake elements and the whole mechanism being arranged in coaxial relation with the wheel 1.

The rotatable brake element 119 is provided with a plurality of spaced outwardly extending fingers 120 projecting from the inner periphery of said element, and secured to the ends of the fingers by cap screws 121 is a ring 122. The rotatable brake element 116 has in its inner periphery a plurality of slots 123 which are equally spaced from each other and through which the fingers 120 extend for supporting said element and for turning same with the wheel 1.

Intermediate each pair of fingers 120 a pin 124 is provided having one end rigidly secured to the rotatable brake element 119 while the other end extends through the ring 122. Each of the pins 124 has a shoulder 125 engaging the inner face of the ring 122 while a nut 126 is provided on each pin engaging the opposite face of the ring for rigidly securing the ring to the pin.

A U-shaped strap 127 is slidably mounted intermediate its ends on each of the pins 124 and the two ends of each strap are welded to the outer face of the rotatable brake element 116 at opposite sides of a slot 128 in said element. A release spring 129 is mounted on each of the pins 124 and bears at one end against the rotatable brake element 119 and at the opposite end against the strap 127. The several release springs 129 are under compression and therefore act to urge the rotatable brake element 116 away from the non-rotatable brake element 119 to a position defined by engagement between the ends of the several straps 127 and the ring 122 which defines the release position of said element.

The brake cylinder device 115 comprises a stationary piston 130 having an inwardly extending flange 131 for mounting against the inner end of the journal box 8 and which is rigidly secured thereto by bolts 34. A brake cylinder casing 132 is slidably mounted on the brake cylinder piston 130 and has a flange 133 extending inwardly from its inner periphery and adapted to engage the piston flange 131 adjacent the piston for defining the release position of said casing. The piston 130 has on its inner end packing cup 134 and between said cup and the casing there is provided a pressure chamber 135 to which fluid under pressure is adapted to be supplied for controlling the operation of the brake mechanism.

The brake cylinder casing is provided around its inner periphery with a plurality of slots 136 extending parallel to the axis thereof. These slots are equally spaced apart and extending through each of these slots and suitably aligned bores in the cylinder flange 133 and piston flange 131 is a release bolt 137. A seat 138 is secured to the end of each bolt 137 beyond the outer face of the piston flange 131. Each of the bolts 137 has a head 139 at its opposite end which is disposed beyond the outer peripherial surface of the rotatable brake element 119. A release spring 140 in each slot 136 is carried by the bolt 137 therein and bears at one end against the head 139 of said bolt while the opposite end bears against the cylinder flange 133 which closes one end of said slot. The several release springs 140 are under compression and therefore act to urge the brake cylinder casing 132 in a direction away from the wheel and to a release position defined by engagement between the cylinder flange 133 and the piston flange 131.

The cylinder flange 133 is of such width as to constitute a portion of the non-rotatable brake element 117 and is provided on its face adjacent the wheel 1 with a brake shoe 141 for frictional contact with the adjacent face of the rotatable brake element 116, said brake shoe being rigidly secured to the flange 133.

The non-rotatable brake element 118 comprises a central backing plate 142 and an annular brake shoe 143 secured to each of the opposite faces of said plate for braking engagement with the adjacent faces of the rotatable brake elements 116 and 119. The backing plate 142 is provided around its outer periphery with a plurality of outwardly extending fingers 144. These fingers are equally spaced apart and arranged to slide in slots 145 which are provided around the inner periphery of the brake cylinder casing 132 between the slots 136, engagement between said fingers and the side walls of slots 145 being adapted to hold the non-rotatable brake element 118 against rotation relative to said casing.

The casing flange 133 closes one end of each slot 145 and in each of these slots is a release spring 146 bearing at one end against the closed end of the slot and bearing at the opposite end against the finger 144 extending into the slot. Over the open end of each slot 145 is a strap 147 secured at its opposite ends by screws 148 to the brake cylinder casing, these straps being arranged to be engaged by fingers 144 for defining the release position of the non-rotatable brake element 118 with respect to the brake cylinder casing and to the rotatable brake elements 116 and 119 when said casing is in its release position above described. It will be noted that the several release springs 146 constantly act to urge the non-rotatable brake element 118 to its release position just described.

*Operation of brake mechanism shown in Figs. 11 to 13*

The operation of this brake mechanism is substantially the same as the previously described embodiments, as will be apparent, and a description thereof is therefore not believed necessary.

*Summary*

It will now be apparent that by arranging the brake cylinder device in concentric and coplanar relation with respect to the brake elements of a disk brake mechanism with either the brake elements surrounding the brake cylinder device or the brake cylinder device surrounding the brake elements, the brake mechanism need be of substantially no greater length than that of the brake cylinder device or of the space required for the brake elements when in their release positions. The brake mechanism will therefore occupy a very minimum of space and is particularly adapted for use on trucks where there is little space available for the installation of a brake mechanism. In certain installations the brake mechanism may be substantially wholly contained within the space usually available between the tread and hub of a railway vehicle wheel. When applied to certain wheel structures such as illustrated in Figs. 1 and 7 the brake mechanism may extend slightly beyond the end face of the wheel but even in such cases the main portion of the brake mechanism is contained within the outline of the wheel, while with another type of wheel such as shown in Fig. 11 the space available for the brake mechanism may be sufficient to wholly contain same.

While the improved brake mechanism is compact it is however relatively simple in construction and is adapted to provide efficient braking of a vehicle over a relatively long period of time.

While several embodiments of the invention have been shown and described in detail it is not the intention to limit the scope to these embodiments or otherwise than by the terms of the appended claims.

Having now described my invention, what I claim as new and desire to secure by Letters Patent is:

1. A brake mechanism for a wheel of a railway vehicle having an axle carried by said wheel and a journal box carried by said axle, said mechanism being disposed in the space between the end of the journal box adjacent the wheel and the adjacent face of said wheel and comprising annular rotatable frictional brake elements secured to rotate with said wheel, annular non-rotatable frictional brake elements interleaved with said rotatable brake elements and an annular brake cylinder means arranged in coaxial and concentric relation with said brake elements and in coaxial relation with said wheel, said brake cylinder means comprising a fixed part secured to said journal box, a movable part slidably mounted on said fixed part and adapted to be operated by fluid under pressure supplied to a chamber between the two parts for moving said non-rotatable brake elements into frictional engagement with said rotatable brake elements. means securing said non-rotatable brake elements to said movable part for holding same against turning, and means securing said movable part against rotation with said rotatable brake elements.

2. A brake mechanism for a vehicle wheel comprising interleaved annular rotatable and non-rotatable friction brake elements, means securing said rotatable brake elements to rotate with said wheel, annular brake cylinder means arranged in coaxial and concentric relation with said brake elements and comprising an annular part fixed against turning and against axial movement and an annular part mounted on the fixed part for movement axially thereof and adapted to be operated by fluid under pressure supplied to a chamber between the two parts for moving said brake elements into frictional interengagement, means securing said non-rotatable brake elements to said movable part for supporting same and for holding same against turning relative to said movable part, said movable part of said brake cylinder means being capable of movement circumferentially of said fixed part, and means independent of said fixed part connected to said movable part for holding same and thereby said non-rotatable brake elements against turning with said rotatable brake elements.

3. A brake mechanism for a railway vehicle wheel having a tread, a hub and a connecting web cooperating to provide an annular cavity in one face of said wheel, said brake mechanism comprising an annular rotatable friction brake element secured to turn with said wheel, an annular non-rotatable friction brake element for frictionally engaging said rotatable brake element to brake said wheel, annular brake cylinder means arranged in coaxial and concentric relation with said brake elements and wheel, said brake cylinder means comprising a fixed part and a movable part slidably mounted on said fixed part for movement axially thereof to effect frictional engagement between said elements, means supporting said non-rotatable brake element from said movable part, and means securing said non-rotatable brake element against turning with said rotatable brake element, said brake elements and brake cylinder means being contained in said cavity.

4. A brake mechanism for a railway vehicle wheel having a tread, a hub, and a connecting web cooperating to provide an annular cavity in one face of said wheel, said brake mechanism comprising an annular rotatable friction brake element secured to turn with said wheel, an annular non-rotatable friction brake element for frictionally engaging said rotatable brake element to brake said wheel, annular brake cylinder means arranged in coaxial and concentric relation with said brake elements and wheel, said brake cylinder means comprising a fixed part and a movable part slidably mounted on said fixed part for movement axially thereof to effect frictional engagement between said elements, means supporting said non-rotatable brake element from said movable part, and means securing said non-rotatable brake element against turning with said rotatable brake element, said brake elements being disposed in said cavity.

5. A brake mechanism for a railway vehicle wheel having a tread, a hub and a connecting web cooperating to provide an annular cavity in one face of said wheel, said brake mechanism comprising an annular rotatable friction brake element secured to turn with said wheel, an annular non-rotatable friction brake element for frictionally engaging said rotatable brake element to brake said wheel, annular brake cylinder means arranged in coaxial and concentric relation with said brake elements and wheel, said brake cylinder means comprising a fixed part and a movable part slidably mounted on said fixed part for movement axially thereof to effect frictional engagement between said elements, means supporting said non-rotatable brake element from said movable part, and means securing said non-rotatable brake element against turning with said rotatable brake element, said brake elements being disposed in said cavity and at least a part of said brake cylinder means being also disposed in said cavity.

6. A brake mechanism for a railway vehicle wheel having a tread, a hub and a connecting web cooperating to provide an annular cavity in one face of said wheel, said brake mechanism comprising an annular rotatable friction brake element secured to turn with said wheel, an annular non-rotatable friction brake element for frictionally engaging said rotatable brake element to brake said wheel, annular brake cylinder means arranged in coaxial and concentric relation with said brake elements and wheel, said brake cylinder means comprising a fixed part and a movable part slidably mounted on said fixed part for movement axially thereof to effect frictional engagement between said elements, means supporting said non-rotatable brake element from said movable part, and means securing said non-rotatable brake element against turning with said rotatable brake element, said brake elements being arranged with one in contact with said wheel web and with at least a portion of the other brake element in said cavity.

7. A brake mechanism for a railway vehicle wheel having a tread, a hub and a connecting web cooperating to provide an annular cavity in one face of said wheel, said brake mechanism comprising an annular rotatable friction brake element secured to turn with said wheel, an annular non-rotatable friction brake element for frictionally engaging said rotatable brake element to brake said wheel, annular brake cylinder means arranged in coaxial and concentric relation with said brake elements and wheel, said brake cylinder means comprising a fixed part and a movable part slidably mounted on said fixed part for movement axially thereof to effect frictional engagement between said elements, means supporting said non-rotatable brake element from said movable part, and means securing said non-rotatable brake element against turning with said rotatable brake element, one of said brake elements being contained wholly within said cavity as well as at least a part of the other brake element and a part of said brake cylinder means.

8. A brake mechanism for a wheel of a railway vehicle truck having an axle carried by said wheel and a journal box mounted on said axle at one side of said wheel, said brake mechanism comprising in the space between said wheel and journal box an annular rotatable friction brake element secured to rotate with said wheel, an annular non-rotatable friction brake element operative to frictionally engage said rotatable brake element to brake said wheel, and an annular brake cylinder means for actuating said non-rotatable brake element, said brake cylinder means being arranged in coaxial and concentric relation with said brake elements and in coaxial relation with said wheel and comprising an annular axially movable part for actuating said non-rotatable brake element and an annular part carrying said axially movable part, and means connected to said journal box and carrying the last named annular part of said brake cylinder means and securing said non-rotatable brake element against rotation with said rotatable brake element.

9. A brake mechanism for a wheel of a railway vehicle truck having an axle carried by said wheel and a journal box mounted on said axle at one side of said wheel, said wheel having an annular cavity in the side adjacent said journal box, said brake mechanism comprising an annular rotatable friction brake element disposed in said cavity in coaxial relation with said wheel and secured to rotate with said wheel, an annular non-rotatable friction brake element arranged in coaxial relation with said rotatable brake element and having at least a portion disposed in said cavity and operative upon frictional engagement with said rotatable brake element to brake said wheel, an annular brake cylinder device comprising an annular fixed part and an annular movable part mounted on and supported by said fixed part and adapted to be moved relative to said fixed part by fluid under pressure supplied to a chamber between the two parts to effect frictional interengagement between said brake elements, the two parts of said brake cylinder device having a portion at least disposed in said cavity in concentric relation with said brake elements, and means secured to said journal box carrying said fixed part and securing said non-rotatable brake element against rotation.

10. A brake mechanism for a vehicle wheel comprising a hub, a tread, and a connecting web and having between said tread and hub at one side of said web an annular cavity, said brake mechanism comprising a pile of interleaved annular rotatable and non-rotatable friction brake elements operative upon frictional interengagement to effect braking of said wheel, said brake elements being disposed in said cavity in concentric relation with said wheel with the brake element at one end of said pile against said web and with a portion at least of the brake element at the opposite end of the pile also in said cavity, means securing said rotatable brake elements to rotate with said wheel, annular brake cylinder means arranged in concentric relation with said brake elements and comprising an annular piston, means supporting said piston and securing same against axial movement, an annular casing slidably mounted on said piston axially thereof, means connecting said casing with the brake element at the opposite end of said pile, said brake cylinder casing being operative by fluid under pressure supplied to a chamber between said piston and casing to actuate said means to urge said brake elements into frictional interengagement to brake said wheel, and means securing said brake cylinder casing and non-rotatable brake elements against rotation with said rotatable brake elements.

11. A brake mechanism for a vehicle wheel comprising an annular rotatable brake element secured to rotate with said wheel in coaxial relation therewith, another annular rotatable brake element arranged in coaxial relation with said wheel, means connecting said rotatable brake elements for rotation in unison and providing for axial movement of the last named rotatable brake element, an annular brake cylinder means arranged in concentric and coaxial relation with said brake elements and comprising a part fixed against axial movement and a movable part slidably mounted on the fixed part, an annular non-rotatable brake element disposed between said two rotatable brake elements in coaxial relation therewith and having a slidable connection with said movable part of said brake cylinder means providing for axial movement thereof but securing same against rotation relative to said movable part, another non-rotatable brake element arranged in coaxial relation with said rotatable brake elements and disposed at the opposite face of the axially movable rotatable brake element, means connecting the last named non-rotatable brake element to said movable part of said brake cylinder means for movement therewith, spring means operatively connecting the two parts of said brake cylinder means for effecting movement of the movable part and thereby of the last named non-rotatable brake element to brake release positions with respect to said fixed part, spring means associated with said movable part operative on the first named non-rotatable brake element for effecting movement thereof relative to said movable part to a brake release position, the movable part of said brake cylinder means being operative by fluid under pressure supplied to a chamber formed between the two parts to actuate said brake elements into frictional braking engagement to brake said wheel.

12. A brake mechanism for a wheel comprising an annular rotatable brake element arranged in coaxial relation with said wheel and rigidly secured to one face of said wheel, a plurality of fingers spaced around said brake element and extending parallel to the axis thereof and rigidly secured at one end to said brake element, stop means rigidly secured to the opposite ends of said fingers, an axially movable brake element slidably mounted on said fingers and rotatable thereby with said wheel, an annular non-rotatable brake element disposed between said two rotatable brake elements, another annular non-rotatable brake element disposed at the opposite face of the axially movable rotatable brake element, an annular brake cylinder means arranged in coaxial relation with said rotatable and non-rotatable brake elements and comprising a part fixed against axial movement and a movable part mounted to slide on said fixed part axially thereof, said movable part having a connection with the last named non-rotatable brake element for actuating same to effect frictional interengagement between all of said brake elements, means connecting the non-rotatable brake element located between the two rotatable brake elements to said movable part securing same against turning relative to said movable part and providing for axial movement thereof relative to said movable part, means securing the other non-rotatable brake element to said movable part for movement therewith, means operative on said movable part for effecting movement thereof and thereby of the non-rotatable brake element connected for movement therewith to brake release positions with respect to said fixed part, means acting on the non-rotatable brake element located between the two rotatable brake elements for effecting movement thereof to brake release positions with respect to said movable part, and springs interposed between and acting on said rotatable brake elements for moving the axially movable rotatable brake element in a direction away from the other rotatable brake element into engagement with said stop means for defining its brake release position.

13. A brake mechanism for a wheel comprising an annular rotatable brake element arranged in coaxial relation with said wheel and rigidly secured to one face of said wheel, a plurality of fingers spaced around said brake element and extending parallel to the axis thereof and rigidly secured at one end to said brake element, stop means rigidly secured to the opposite ends of said fingers, an axially movable brake element slidably mounted on said fingers and rotatable thereby with said wheel, an annular non-rotatable brake element disposed between said two rotatable brake elements, another annular non-rotatable brake element disposed at the opposite face of the axially movable rotatable brake element, an annular brake cylinder means arranged in coaxial relation with said rotatable and non-rotatable brake elements and comprising a part fixed against axial movement and a movable part mounted to slide on said fixed part axially thereof, said movable part having a connection with the last named non-rotatable brake element for actuating same to effect frictional interengagement between all of said brake elements, means connecting the non-rotatable brake element located between the two rotatable brake elements to said movable part securing same against turning relative to said movable part and providing for axial movement thereof relative to said movable part, means securing the other non-rotatable brake element to said movable part for movement therewith, means operative on said movable part for effecting movement thereof and thereby of the non-rotatable brake element connected for movement therewith to brake release positions with respect to said fixed part, means acting on the non-rotatable brake element located between the two rotatable brake elements for effecting movement thereof to brake release positions with respect to said movable part, tension springs operatively connecting said stop means and the axially movable rotatable brake element for moving same in a direction away from the other rotatable brake element and into engagement with said stop means for defining its brake release position.

14. A brake mechanism for a wheel comprising a pair of annular rotatable brake elements and a pair of annular non-rotatable brake elements arranged in a pile in interleaved relation and in coaxial relation with said wheel, means securing the rotatable brake element at one end of said pile to said wheel against axial movement and to rotate with said wheel, means securing the other rotatable brake element to rotate with said wheel and providing for axial movement thereof, annular brake cylinder means arranged in coaxial and concentric relation with said brake elements and comprising a part fixed against axial movement and an axially movable part slidably mounted on the fixed part, means connecting said movable part to the non-rotatable brake element at the opposite end of said pile and operative upon movement of said movable part relative to said fixed part by fluid under pressure supplied to a chamber between the two parts to apply force to said opposite end of said pile for effecting frictional interengagement between said brake elements, said movable part and the non-rotatable brake element between the two rotatable brake elements having a connection holding such non-rotatable brake element against turning relative to said movable part but providing for axial movement of the non-rotatable brake element relative to said movable part, means for moving said movable part and the non-rotatable brake element secured for movement therewith to brake release positions, means operative on the axially movable rotatable brake element for moving same in a direction away from the other rotatable brake element to a brake release position, spring means acting on the non-rotatable brake element located between the two rotatable brake elements for moving same axially of said movable part to a brake release position with respect to said movable part, and means associated with said movable part for defining the release position of the last named non-rotatable brake element.

15. In a disk brake mechanism for braking a rotatable element, annular rotatable and non-rotatable friction braking disks normally spaced apart and arranged for frictional braking interengagement for braking said element, and annular motor means encircling said disks and comprising a fixed part and a movable part carried by and movable relative to said fixed part to effect the frictional braking interengagement of said disks, said movable part supporting the non-rotatable disk.

16. In a disk brake mechanism for braking a rotatable element, a pile of interleaved normally spaced apart annular rotatable and non-rotatable friction braking disks, one of said rotatable disks being fixed against movement in a direction axially of said element and all of the other of said disks being movable axially of the element towards the fixed disk, motor means encircling said element and comprising means movable endwise axially of the member for effecting the frictional interengagement of said friction braking disk to brake said element, the last named means supporting said non-rotatable disks and holding same against rotation, and means securing said last named means against rotation about said element.

17. A brake mechanism for a truck having a wheel provided centrally with a hub, an axle extending through said hub and a journal box mounted on said axle adjacent the end of said hub, said brake mechanism comprising a rotatable friction disk associated with said wheel for rotation therewith, a non-rotatable friction disk, said disks being normally spaced apart and being adapted to frictionally interengage to brake said wheel, and annular motor means operative to effect frictional interengagement of said disks, said motor means being arranged in coaxial relation with said disks and wheel and in concentric relation with said disks and being carried by said journal box and overlapping said hub of said wheel.

18. A brake mechanism for a truck having a wheel provided centrally with a hub, an axle extending through said hub and a journal box mounted on said axle adjacent the end of said hub, said brake mechanism comprising a rotatable friction disk associated with said wheel for rotation therewith, a non-rotatable friction disk, said disks being normally spaced apart and being adapted to frictionally interengage to brake said wheel, and annular motor means comprising a part fixed to said journal box and a movable part carried by the fixed part and overlapping said hub of said wheel, said movable part being operative to effect frictional interengagement of said disks, said movable part being arranged in coaxial relation with said disks and wheel and in concentric relation with said disks.

19. A brake mechanism for a truck having a wheel provided centrally with a hub, an axle extending through said hub and a journal box mounted on said axle adjacent the end of said hub, said brake mechanism comprising a rotatable friction disk associated with said wheel for rotation therewith, a non-rotatable friction disk, said disks being normally spaced apart and being adapted to frictionally interengage to brake said wheel, and annular motor means comprising a part fixed to said journal box and a movable part carried by said fixed part and overlapping said hub and movable relative to said fixed part in the direction of said wheel to effect frictional interengagement of said disks, said movable part carrying said non-rotatable disk, and means securing said non-rotatable disk against rotation.

20. A brake mechanism for a truck having a wheel provided centrally with a hub, an axle extending through said hub and a journal box mounted on said axle adjacent the end of said hub, said brake mechanism comprising a rotatable friction disk associated with said wheel for rotation therewith, a non-rotatable friction disk, said disks being normally spaced apart and being adapted to frictionally interengage to brake said wheel, and annular motor means comprising a part fixed to said journal box and a movable part carried by said fixed part and overlapping said hub and movable relative to said fixed part in the direction of said wheel to effect frictional interengagement of said disks, said movable part carrying said non-rotatable disk, and securing same against rotation relative thereto, and means securing said movable part against rotation.

21. A brake mechanism for a truck having a wheel provided centrally with a hub, an axle extending through said hub and a journal box mounted on said axle adjacent the end of said hub, said brake mechanism comprising a rotatable friction disk associated with said wheel for rotation therewith, a non-rotatable friction disk, said disks being normally spaced apart and being adapted to frictionally interengage to brake said wheel, and annular motor means comprising a part fixed to said journal box and a movable part carried by said fixed part and overlapping said hub and movable relative to said fixed part in the direction of said wheel to effect frictional interengagement of said disks, said movable part carrying said non-rotatable disk, and means connecting said movable part and said non-rotatable disk to said fixed part for securing same against rotation.

GEORGE K. NEWELL.